(12) United States Patent
Addy

(10) Patent No.: US 7,764,388 B2
(45) Date of Patent: Jul. 27, 2010

(54) AUTOFOCUS CONTROL VOLTAGE FOR INDICATING PACKAGE DIMENSIONS

(75) Inventor: Kenneth L. Addy, Massapequa, NY (US)

(73) Assignee: Honeywell International Inc., Morristown, NJ (US)

( * ) Notice: Subject to any disclaimer, the term of this patent is extended or adjusted under 35 U.S.C. 154(b) by 340 days.

(21) Appl. No.: 11/967,513

(22) Filed: Dec. 31, 2007

(65) Prior Publication Data

US 2009/0171620 A1 Jul. 2, 2009

(51) Int. Cl.
*G01B 11/14* (2006.01)
*G01B 11/02* (2006.01)
*G02B 6/00* (2006.01)

(52) U.S. Cl. .................. 356/625; 356/635; 382/141
(58) Field of Classification Search .......... 356/123–127
See application file for complete search history.

(56) References Cited

U.S. PATENT DOCUMENTS

| 5,656,799 | A | 8/1997 | Ramsden et al. |
| 6,382,515 | B1 | 5/2002 | Good et al. |
| 7,436,525 | B2 * | 10/2008 | Mukai et al. ................. 356/603 |
| 2007/0080280 | A1 * | 4/2007 | Havens .................... 250/201.1 |

* cited by examiner

*Primary Examiner*—Michael P Stafira
(74) *Attorney, Agent, or Firm*—Husch Blackwell Sanders Welsh & Katz

(57) ABSTRACT

A system and method for determining dimensions of a package during imaging for supply chain management is provided. The system and method utilize a value of an auto focus control voltage when an image of a package is in focus to calculate a magnification ratio. The calculated magnification ratio is used to multiply the dimensions of the package image to obtain the dimensions of the package.

9 Claims, 2 Drawing Sheets

AUTOFOCUS CONTROL VOLTAGE FOR INDICATING PACKAGE DIMENSIONS

I. FIELD OF THE INVENTION

The present invention relates generally to supply chain control systems. More specifically, the present invention relates to a system and method for tracking packages moving through a supply chain.

II. BACKGROUND OF THE DISCLOSURE

In supply chain operations, 2D imagers are used to scan barcode identification information, and additionally to record an image of a package as it moves through the supply chain. In current applications, liquid lenses and other auto focus lenses are used to improve end-user experience by improving depth of field of the 2D imagers.

Conventional supply chain control systems do not record the dimensions of a package as the 2D imagers image the barcode.

Liquid lenses, such as Philips' FluidFocus and lenses developed by Varioptic use liquids to create mechanically variable lenses that have electrically controllable focal points and shapes. These liquid lenses, also referred to as electrowetting, use the voltage or current to vary the geometry of the lens, thereby adjusting the focal length as desired.

Another type of liquid lens is a pressure lens. With pressure lenses, a piezoelectric element is used as a pump to either increase or decrease the pressure of a liquid drop acting as a lens. As the pressure is increased, the curvature of the liquid drop increases, while a reduction in pressure causes the liquid drop to flatten. This produces a lens that is very thin yet capable of auto focus and zoom.

III. SUMMARY OF THE DISCLOSURE

In an embodiment of the present invention, a system for determining dimensions of a package during imaging is provided. The system includes a lens assembly for focusing an image of a package onto an image sensor. A focus controller determines if the image of the package is in focus, and varies a control voltage applied to the lens assembly to adjust the focus as needed. A processor reads a value of the control voltage when the image is in focus, computes a focal length of the lens assembly from the value, and calculates actual dimensions of the package based on the computed focal length and the image.

In another embodiment of the present invention, a method is provided for determining dimensions of a package during imaging. The method includes the steps of adjusting a control voltage for varying a focal length of a lens assembly for focusing an image of a package onto an imaging sensor; reading a control voltage value when the image is in focus; computing a focal length of the lens assembly based on the control voltage value; and calculating actual dimensions of the package from the focal length and the image.

In yet another embodiment of the present invention, a system is provided for determining dimensions of a package during imaging. The system includes a liquid lens assembly for focusing an image of a package onto an image sensor; a focus controller for determining if the image of the package is in focus, and varying a control voltage applied to the liquid lens assembly to adjust the focus as needed; and a processor for reading a value of the control voltage when the image is in focus, computing a focal length of the lens assembly from the value, and calculating actual dimensions of the package based on the computed focal length and the image.

IV. BRIEF DESCRIPTION OF THE DRAWINGS

These and other features, aspects, and advantages of the present invention will become better understood with regard to the following description, appended claims, and accompanying drawings wherein:

V. DETAILED DESCRIPTION OF DISCLOSURE

Figure 1:
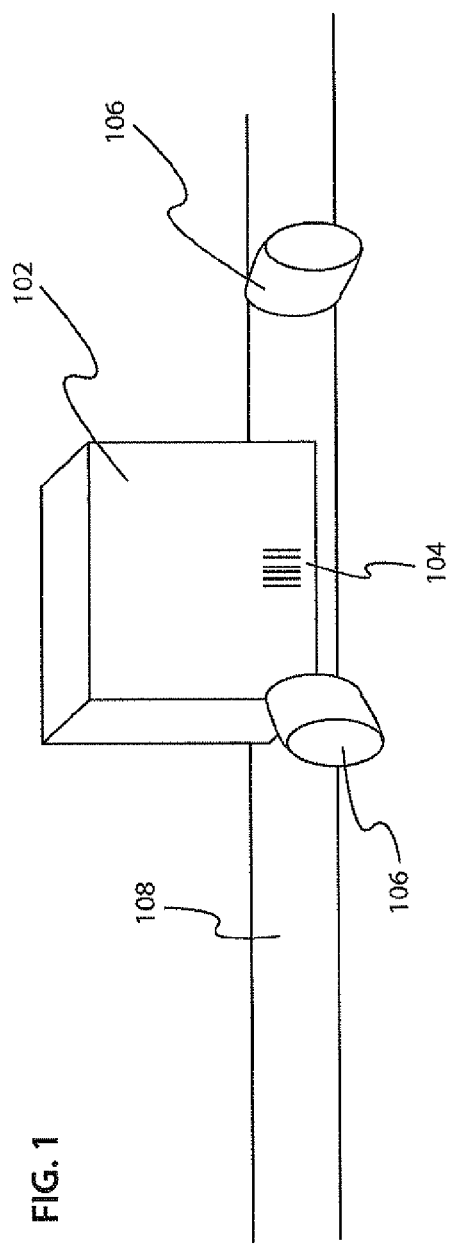
FIG. 1 is a schematic representation of a prior art package imaging system.

The system shown in FIG. 1 represents a supply chain management system where packages 102 having barcodes 104 are scanned by imagers 106 as the packages are moved along a conveyance 108. The imagers 106 are used to read the barcodes 104 on the passing packages 102 so that the packages can be tracked by the supply chain management system.

Figure 2:
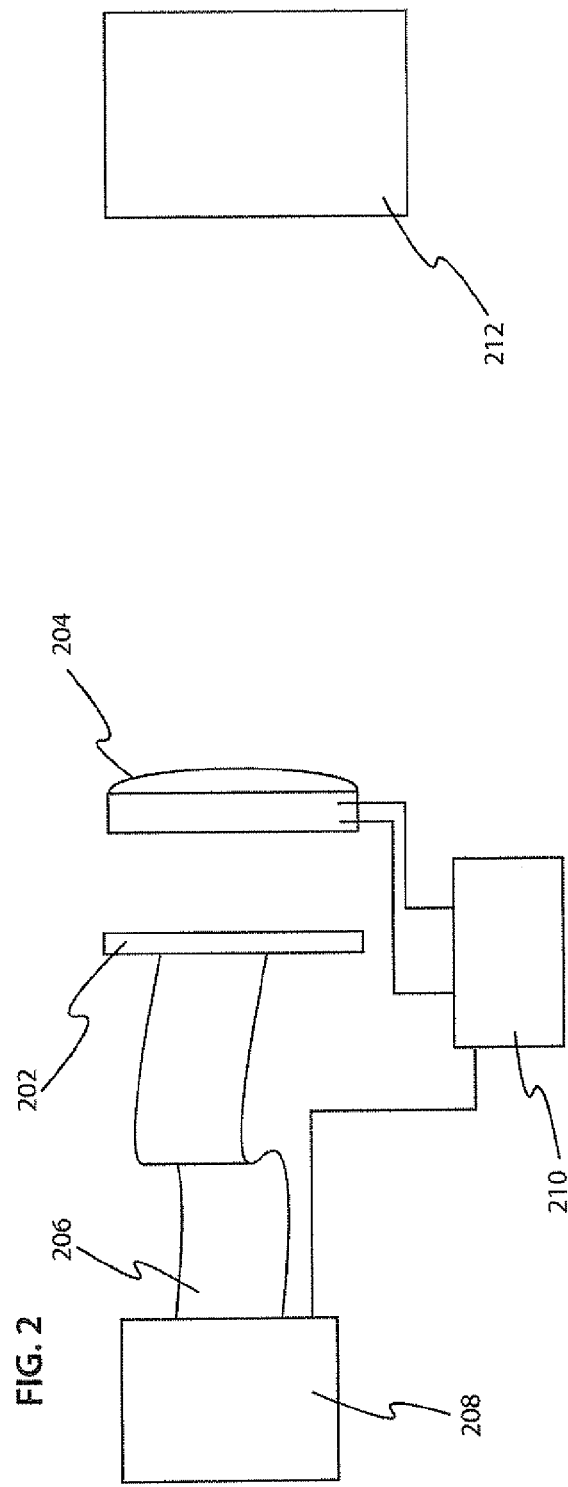
FIG. 2 is a schematic representation of a package imaging system of one embodiment of the present invention.

Turning to FIG. 2, a schematic representation of the components that make up an imager used in an embodiment of the present invention is shown. The imager includes a 2 dimensional image sensor 202 and a lens assembly 204 for focusing an image of a package 212 onto the image sensor 202. In addition, the image sensor 202 is communication with an image processor unit 208 by way of, for example, a ribbon cable 206 or other appropriate structure. The image processor unit 208 receives raw image data from the image sensor and processes the data to identify the barcode of the package, as well as to determine if the image is in focus.

In one embodiment, the lens assembly is a liquid lens assembly that has an electrically adjustable focal length. With liquid lenses, the focal length is a linear function of the applied voltage or current, such that by varying the voltage or current applied to the liquid lens assembly, the focal length can be proportionally increased or decreased as needed. The direct relation between the applied voltage and changes in focal length of the liquid lens can be used to find the distance of a package from the lens.

In the present embodiment, an auto focus control unit 210 is connected to the lens assembly 204 by electrically conductive leads. The auto focus control unit 210 controls the voltage applied to the liquid lens assembly in order to adjust the shape of the liquid lens, thereby varying the focal length of the liquid lens.

The image sensor 202 is positioned at a fixed and known distance ($D_i$) from the lens assembly 204. While the package is at some arbitrary distance ($D_a$) from the lens assembly. The focal length of the lens ($D_f$) is a function of the lens geometry resulting from the value of the control voltage applied to the lens assembly. Using the following equation:

$$\frac{1}{D_a} + \frac{1}{D_i} = \frac{1}{D_f} \qquad [\text{EQ. 1}]$$

In combination with the Equation for magnification (M):

$$M = \frac{D_i}{D_a} \quad [\text{EQ. 2}]$$

The ratio of magnification (M) can be expressed as the known distance between the lens and the image sensor ($D_i$) and the focal length ($D_f$):

$$M = \frac{D_i^2}{D_f} \quad [\text{EQ. 3}]$$

With the ratio of magnification (M) the dimensions of the package can be calculated from the dimensions of the image, such that a length X of the image would equal MX length on the package. Thus, if the image of the package has a length of 2 mm and the ratio of magnification M is 100, the actual length of the package would be 20 cm.

Figure 3:
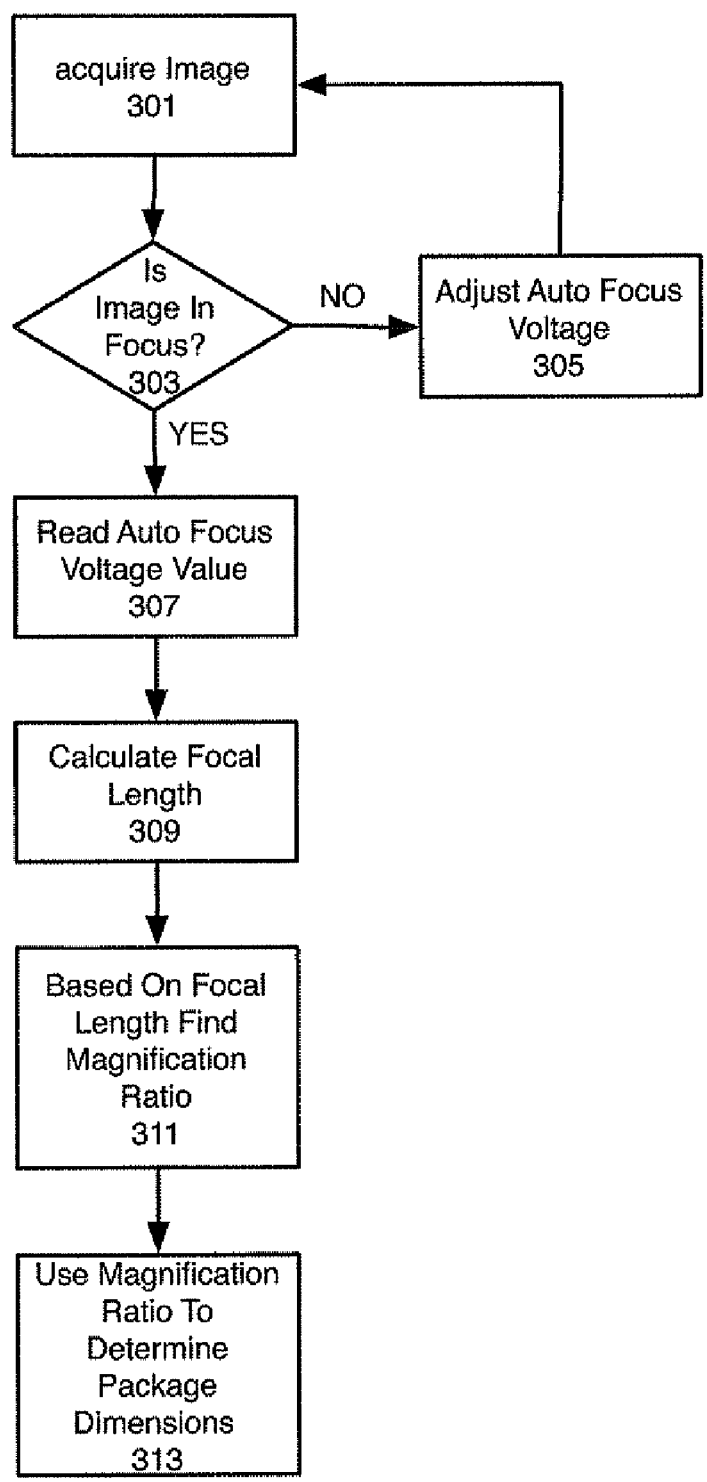
FIG. 3 is a flow diagram of the process for performing package imaging according to one embodiment of the present invention.

Turning to FIG. 3, steps involved in performing an embodiment of the present invention are shown. Beginning with step 301, an image of a package is acquired by an image sensor. The image is analyzed to determine if the imaged package is in focus at step 303. If the image is not in focus, the process branches to step 305 where an auto focus control voltage is adjusted. The process then returns to step 301 where a new image is acquired.

However, if the image is in focus, the process continues on to step 307, where the value of the auto focus control voltage is read. In step 309, the focal length is calculated using the control voltage value.

In step 311, the magnification ratio is calculated using EQ. 3 and the calculated focal length. Once the magnification ratio is calculated, the dimensions of the image of the package are multiplied by the magnification ratio in step 315 to obtain the actual dimensions of the package.

While the above embodiments have been described using liquid lens assemblies, any lens assembly where the focal length can be related to a function of a control voltage can be used in place of the liquid lens assembly described above.

The described embodiments of the present invention are intended to be illustrative rather than restrictive, and are not intended to represent every embodiment of the present invention. Various modifications and variations can be made without departing from the spirit or scope of the invention as set forth in the following claims both literally and in equivalents recognized in law.

What is claimed is:

1. A system for determining dimensions of a package during imaging, said system comprising:
    a lens assembly for focusing an image of a package onto an image sensor;
    a focus controller for determining if said image of said package is in focus, and varying a control voltage applied to said lens assembly to adjust said focus as needed; and
    a processor for reading a value of said control voltage when said image is in focus, calculating a focal length of said lens assembly from said value, and calculating dimensions of said package based on said computed focal length and said image, wherein said processor uses said computed focal length and a preset distance between said lens assembly and said image sensor to calculate a magnification ratio, said magnification ratio being applied to a dimension of said image to calculate said package dimensions.

2. The system as in claim 1, wherein said lens assembly is an electrowetting liquid lens having an optical geometry that is variable based on said control voltage.

3. The system as in claim 1, wherein said lens assembly is a pressure liquid lens having a piezoelectric pump driven by said control voltage.

4. A method for determining dimensions of a package during imaging, said method comprising:
    adjusting a control voltage for varying a focal length of a lens assembly for focusing an image of a package onto an imaging sensor;
    reading control voltage value when said image is in focus;
    computing a focal length of said lens assembly based on said control voltage value;
    calculating dimensions of said package from said focal length and said image; and
    using said computed focal length and a present distance between said lens assembly and said image sensor to obtain a magnification ratio, said magnification ratio being applied to a dimension of said image to calculate said package dimensions.

5. The method as in claim 4, wherein said lens assembly is an electrowetting liquid lens having an optical geometry that is variable based on said control voltage.

6. The method as in claim 4, wherein said lens assembly is a pressure liquid lens having a piezoelectric pump driven by said control voltage.

7. A system for determining dimensions of a package during imaging, said system comprising:
    a liquid lens assembly for focusing an image of a package onto an image sensor;
    a focus controller for determining if said image of said package is in focus, and varying a control voltage applied to said liquid lens assembly to adjust said focus as needed; and
    a processor for reading a value of said control voltage when said image is in focus, computing a focal length of said lens assembly from said value, and calculating dimensions of said package based on said computed focal length and said image, wherein said processor uses said computed focal length and a preset distance between said lens assembly and said image sensor to calculate a magnification ratio, said magnification ratio being applied to a dimension of said image to calculate said package dimensions.

8. The system as in claim 7, wherein said liquid lens assembly is an electrowetting liquid lens having an optical geometry that is variable based on said control voltage.

9. The system as in claim 7, wherein said liquid lens assembly is a pressure liquid lens having a piezoelectric pump driven by said control voltage.

* * * * *